Dec. 3, 1940.  W. SCHRÖDER  2,224,088
GLASS BODY
Filed April 22, 1939
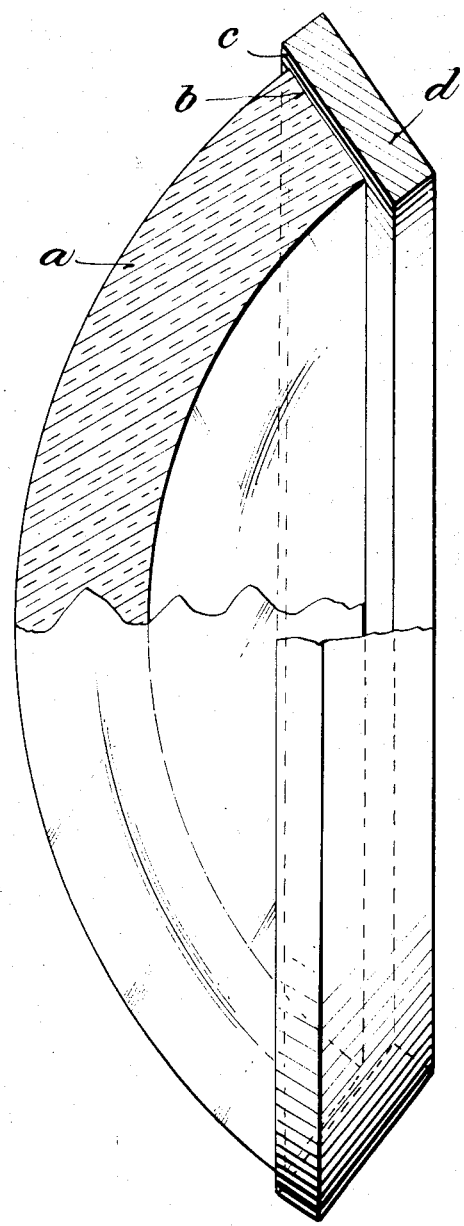
Inventor
Walter Schröder,
By Bailey & Carson
Attorneys Patented Dec. 3, 1940

2,224,088

UNITED STATES PATENT OFFICE 2,224,088

GLASS BODY

Walter Schröder, Berlin-Steglitz, Germany

Application April 22, 1939, Serial No. 269,547
In Germany January 29, 1938

1 Claim. (Cl. 88—59)

The invention relates to glass bodies subjected to heavy loads.

In the past many constructions have been suggested for the production of a glass body which can be used in places where it is subjected to heavy loads and shocks. For example, traffic guides on the surface of a street, skylights for basements located in a sidewalk, and the like are all subjected to heavy loads.

It has been usual in the manufacture of such devices to form the glass body in a number of small parts embedded in an iron structure having crossed frame members. The load is supported by the iron framework, but the glass must be made very thick unless a very heavy framework is used.

The object of the present invention is to provide a glass member and a member mounting therefor such that a comparatively thin piece of glass having a large area may be used without intermediate support.

Another object of the invention is to provide a structure which permits the elimination of a heavy metal framework, so that it is possible to use glass for many purposes for which it is now useless.

The invention is based on the fact that the strength of glass in compression is much greater than its strength in tension.

When a flat glass plate is placed on two opposed supports and subjected to load between them it is bent by the load and the underside is expanded, or subjected to tensile strength. This tension on the underside starts a crack in the glass, which of course spreads to the whole body.

According to the invention, the glass body is to be so formed and supported that tensile loads on the glass itself will be substantially avoided, and that the load will be almost entirely borne by compression in the glass.

Further objects and advantages of the invention will appear more fully from the following description, particularly when taken in conjunction with the accompanying drawing, which forms a part thereof.

In the drawing, the figure shows in cross section a glass body and a support therefor embodying my invention.

The primary feature of the invention resides in the fact that the glass body is no longer supported by its lower face on a flat supporting member. On the contrary, the glass has a frusto-conical edge, which engages with a frusto-conical surface of a support. To give further strength the glass may be arched or dome shaped.

As shown for example in the drawing, the dome shaped glass body $a$ has its edge $b$ of frusto-conical shape. Of course in the case of a round glass body this surface would be that of a frustum of a right circular cone, while in a rectangular body it would be that of a pyramid. The term "frusto-conical" is therefore used in its broad sense, as covering both circular or curved cones and rectangular or polygonal pyramids.

The frusto-conical edge $b$ rests on the frusto-conical surface $c$ of a supporting ring $d$. This ring is preferably formed of steel or of some strong material, sufficient to carry the loads to which it is subjected through its tensile strength.

In the embodiment shown in the drawing, the dome is spherical, and the surface $b$ is radial to the center of the sphere, or, in other words, has the center of the sphere as its apex. Of course the surface $c$ has a common apex with the surface $b$.

Other shapes, however, may be used without departing from the spirit of the invention. The particular advantage of the spherical shape is that the supporting plane of conical surface $c$ is perpendicular to the pressure components, which are exerted when the glass body is subjected to a load.

In any event, the surfaces and shape of the glass should be so chosen that when a load is placed on the glass the forces thereof are equalized throughout the body of the glass, so that the glass is not subjected to tensile stress.

While I have described herein one embodiment of my invention I wish it to be understood that I do not intend to limit myself thereby except within the scope of the appended claim.

I claim:

In combination, a convexo-concave glass body of substantial thickness which is adapted to sustain high pressure loads, said body having concentric spherical upper and lower surfaces, and a frusto-conical edge of substantial width the apex of which is on the concave side of the body opposite to the side normally subjected to pressure, and an annular support of a material having high tensile strength having a similar frusto-conical surface engaging around and abutting against said edge, said frusto-conical edge and surface being radial to the center of said spherical surfaces, said body resting by its frusto-conical edge only within said annular support, whereby the forces are equalized throughout the body of the glass and tensile stress on the glass is avoided.

WALTER SCHRÖDER.